US007398091B2

(12) United States Patent  (10) Patent No.: US 7,398,091 B2
Chen  (45) Date of Patent: Jul. 8, 2008

(54) METHOD AND APPARATUS FOR PROVIDING A MULTIMEDIA BROADCAST/MULTICAST SERVICE IN A VISITED NETWORK

(75) Inventor: Bonnie Chen, DeSoto, TX (US)

(73) Assignee: Motorola, Inc., Schaumburg, IL (US)

( * ) Notice: Subject to any disclaimer, the term of this patent is extended or adjusted under 35 U.S.C. 154(b) by 487 days.

(21) Appl. No.: 11/039,139

(22) Filed: Jan. 19, 2005

(65) Prior Publication Data

US 2005/0170842 A1 Aug. 4, 2005

Related U.S. Application Data

(60) Provisional application No. 60/541,023, filed on Feb. 2, 2004.

(51) Int. Cl.
*H04Q 7/20* (2006.01)
(52) U.S. Cl. ................... 455/454; 455/436; 455/437; 455/438; 455/439; 455/442; 455/443; 455/448
(58) Field of Classification Search ............. 455/454, 455/466, 450, 465, 436, 437, 438, 439, 442, 455/443, 448
See application file for complete search history.

(56) References Cited

U.S. PATENT DOCUMENTS 7,197,333 B2 * 3/2007 Hwang et al. ............... 455/560
7,242,919 B2 * 7/2007 Kim et al. ................... 455/313
2004/0142706 A1 * 7/2004 Kim et al. ................... 455/458
2004/0147266 A1 * 7/2004 Hwang et al. ............... 455/445
2004/0227618 A1 * 11/2004 Hwang et al. .............. 340/7.46
2006/0104225 A1 * 5/2006 Kim et al. ................... 370/313
2006/0109812 A1 * 5/2006 Kim et al. ................... 370/329

OTHER PUBLICATIONS

3GPP TR 23.846 (Dec. 2002), pp. 43-44, fig. 21.
3GPP TS 23.246 (Jul. 2003), pp. 9-11, fig. 2.

* cited by examiner

*Primary Examiner*—David Q Nguyen
(74) *Attorney, Agent, or Firm*—Steven A. May

(57) ABSTRACT

A communication system provides a Multimedia Broadcast/Multicast Service (MBMS) to a roaming user equipment (UE) by receiving, at a first network, a request from the UE to subscribe to an MBMS service and, in response to receiving the request, conveying to the UE a Temporary Mobile Group Identity (TMGI) that is uniquely associated with the MBMS service and the first network. When the first network receives information associated with a registration of the UE with a second network and further receives MBMS data associated with the MBMS service, the first network conveys the MBMS data and the TMGI to the UE via the second network. By using a TMGI that is unique to the MBMS service and the first network, the UEs subscribed to an MBMS service at the second network ignore a notification conveyed to the UE by the second network, thereby preserving a battery life of such UEs.

18 Claims, 5 Drawing Sheets

METHOD AND APPARATUS FOR PROVIDING A MULTIMEDIA BROADCAST/MULTICAST SERVICE IN A VISITED NETWORK

CROSS-REFERENCE TO RELATED APPLICATION

This application is related to U.S. patent application Ser. No. 10/945,481, filed on Sep. 20, 2004, and claims priority from provisional application Ser. No. 60/541,023, entitled "METHOD AND APPARATUS FOR PROVIDING A MULTIMEDIA BROADCAST/MULTICAST SERVICE IN A VISITED NETWORK," filed Feb. 2, 2004, which is commonly owned and incorporated herein by reference in its entirety.

FIELD OF THE INVENTION

The present invention relates generally to packet data communication systems, and, in particular, to a multimedia broadcast multicast service in a packet data communication system.

BACKGROUND OF THE INVENTION

The Universal Mobile Telecommunication Service (UMTS) standard provides a compatibility standard for cellular mobile telecommunications systems. The UMTS standard ensures that a user equipment (UE) operating in a UMTS system can obtain communication services when operating in a system manufactured according to the standard. To ensure compatibility, radio system parameters and data transfer procedures are specified by the standard, including protocols governing digital control messages and bearer traffic that are exchanged over an air interface.

The UMTS standards provide, in 3GPP TS 25.344 (Third Generation Partnership Project Technical Specification 25.344) v0.5.0, 3GPP TS 23.246 v2.0.0, and 3GPP TS 23.846 v6.1.0, for a provision of a Multimedia Broadcast/Multicast Service (MBMS) by a UMTS communication system to MSs serviced by the system and subscribed to the service. When a user equipment (UE) activates in a communication system that provides an MBMS service, such as a broadcast of audio, video, and/or data concerning a sporting event such as a Super Bowl or a World Cup soccer game, the UE may subscribe to the MBMS service by registering for the service with one or more of a Support Node and a Broadcast Multicast Service Center (BM-SC) serving the UE. By subscribing to the MBMS service, a UE joins a subscription group associated with the service.

When the serving BM-SC receives MBMS data associated with the MBMS service, the BM-SC forwards the data to a Radio Network Controller (RNC) serving the UE via the serving Support Node. In response to receiving the MBMS data, the RNC broadcasts an MBMS notification to all UEs serviced by the RNC. In response to receiving the MBMS notification, each UE that is subscribed to the MBMS service conveys a connection request, typically a Radio Resource Control (RRC) connection establishment request, to the RNC via an access channel and a corresponding Node B. Upon receiving the connection requests from each of the subscribed UEs, the RNC counts a number of responding UEs serviced by each Node B and sets up a communication session at each Node B by establishing a Point-to-Multipoint (PTM) communication channel or Point-to-Point (PTP) communication channels with each responding UE serviced by the Node B based on the number of responding UEs serviced by the Node B. Upon establishing the PTM communication channel or PTP communication channels at the serving Node B, the RNC conveys the MBMS data to the subscribed UEs via the established channel or channels.

A problem arises with respect to an efficient method of notifying a roaming MBMS user of the upcoming MBMS data transmission. When a subscribed UE has roamed to a visited network outside of the UE's home MBMS service area, that is, the service area of a home BM-SC with which the UE has registered for the MBMS service or that serves the Support Node with which the UE has registered the UE will not receive the MBMS service to which the UE has subscribed.

Therefore, a need exists for a method and apparatus that provides for provision of an MBMS service to a subscribed UE that has roamed outside of its home MBMS service area.

DETAILED DESCRIPTION OF THE INVENTION

To address the need for a method and an apparatus that that provides for provision of an MBMS service to a subscribed UE that has roamed outside of its home MBMS service area, a communication system provides a Multimedia Broadcast/Multicast Service (MBMS) to a roaming user equipment (UE) by receiving, at a first network, a request from the UE to subscribe to an MBMS service and, in response to receiving the request, conveying to the UE a Temporary Mobile Group Identity (TMGI) that is uniquely associated with the MBMS service and the first network. When the first network receives information associated with a registration of the UE with a second network and further receives MBMS data associated with the MBMS service, the first network conveys the MBMS data and the TMGI to the UE via the second network. By using a TMGI that is unique to the MBMS service and the first network, the UEs subscribed to an MBMS service at the second network ignore a notification conveyed to the UE by the second network, thereby preserving a battery life of such UEs. In addition, upon receiving the registration information from the second network, a Support Node or an MBMS server of the first network may flag the UE, thereby facilitating a conveyance of the MBMS data to the UE when the UE has roamed.

Generally, an embodiment of the present invention encompasses a method for providing a Multimedia Broadcast/Multicast Service (MBMS) to a roaming user equipment (UE). The method includes receiving a request from the UE to subscribe to an MBMS service and, in response to receiving the request, conveying to the UE a Temporary Mobile Group Identity (TMGI) associated with the MBMS service and with a first network associated with the MBMS server. The method further includes receiving information associated with a registration of the UE with a second network, receiving, by the MBMS server, MBMS data associated with the MBMS service, and conveying the MBMS data and the TMGI to the UE via the second network.

Another embodiment of the present invention encompasses an MBMS server that receives a request associated with a UE to participate in an MBMS service, in response to receiving the request, conveys a TMGI associated with the MBMS service and a first network in which the MBMS server resides, receives MBMS data associated with the MBMS service, and conveys the MBMS data and the TMGI to the UE via a second network.

Yet another embodiment of the present invention encompasses a Support Node capable of providing a Multimedia Broadcast/Multicast Service (MBMS) service to a user equipment (UE) roaming outside of a first network associated with the Support Node, wherein the Support Node receives information from a second network servicing the UE and, in response to receiving the information, stores a flag in association with the UE.

Figure 1:
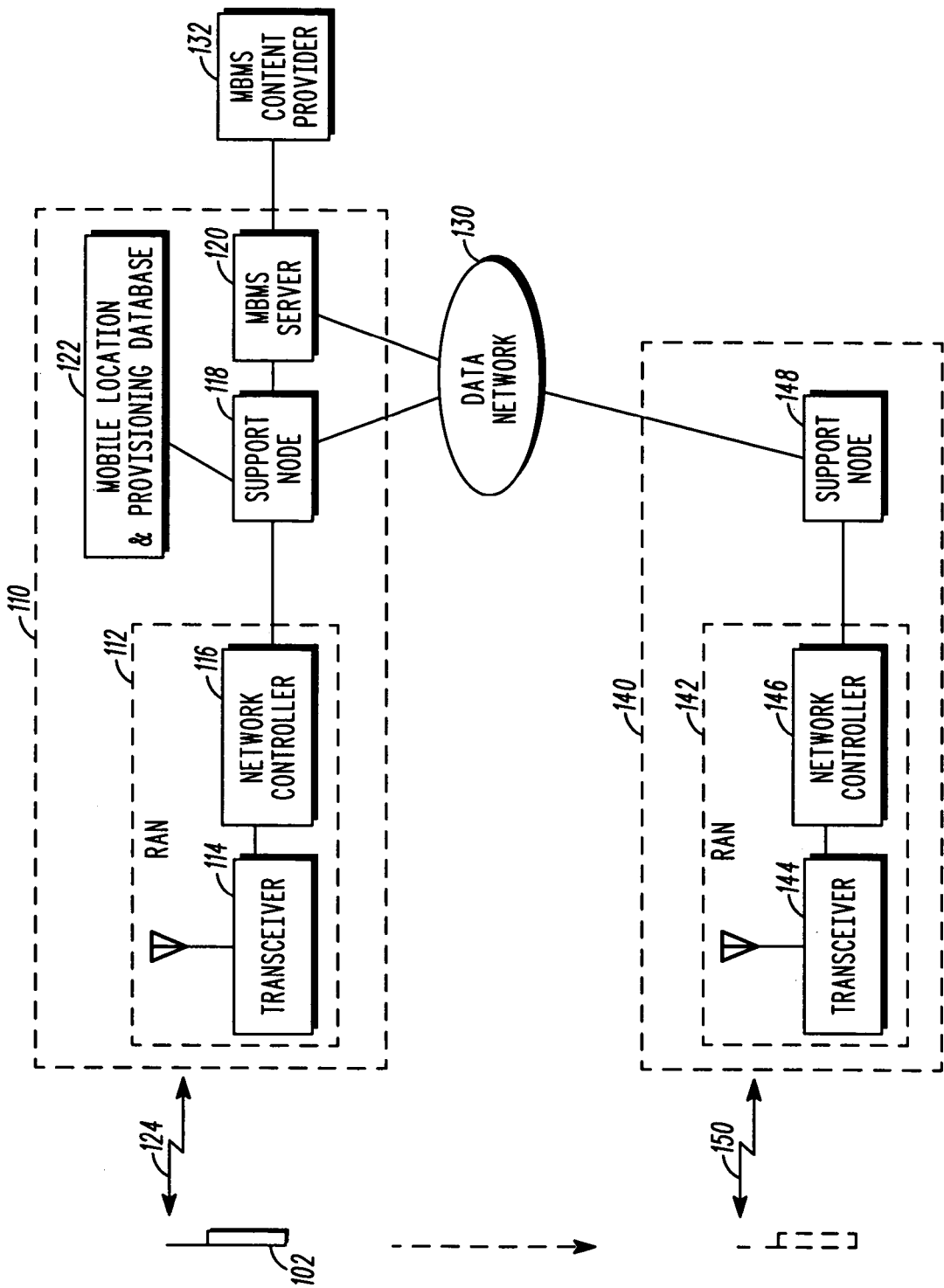
FIG. 1 is a block diagram of a wireless communication system in accordance with an embodiment of the present invention.

The present invention may be more fully described with reference to FIGS. 1-5C. FIG. 1 is a block diagram of a wireless communication system 100 in accordance with an embodiment of the present invention. Communication system 100 includes a first network 110, such as a first Public Land Mobile Network (PLMN), comprising a first Radio Access Network (RAN) 112 coupled to a first Support Node 118. Network 110 further comprises a first Multimedia Broadcast/Multicast Service (MBMS) server 120, preferably a Broadcast Multicast Service Center (BM-SC), and a Mobile Location & Provisioning Database 122 that are each coupled to Support Node 118. Communication system 100 further includes a second network 140, such as a second PLMN, comprising a second Radio Access Network (RAN) 142 coupled to a second Support Node 148. Each RAN 110, 142 includes a respective at least one transceiver, preferably a Node B, 114, 144 that is operably coupled to a respective network controller 116, 146, preferably a Radio Network Controller (RNC). Each Support Node 118, 148 comprises one or more Serving 3G-GPRS Support Nodes (SGSNs) that are each coupled to one or more Gateway 3G-GPRS Support Nodes (GGSNs). However, the precise architecture of each of Support Nodes 118, 148 is up to an operator of communication system 100 and is not critical to the present invention. Each network 110, 140, and in particular Support Node 118 and MBMS server 120 of network 110 and Support Node 148 of network 140, is further coupled to a data network 130, preferably an Internet Protocol (IP) network, that provides a packet switched link between network 110 and network 140.

Mobile Location & Provisioning Database 122 maintains a record of a UE identifier (mobile ID), such as an International Mobile Subscriber Identity (IMSI), associated with each UE subscribed to communication services provided by an operator of network 110. Database 122 further maintains and tracks provisioning and mobility information with respect to each such UE, including registration of the UE when the UE activates in communication system 100. Among the information maintained in Database 122 is a location of each such UE, such as a RAN serving the UE, and a network service identifier (network service ID) associated with a network currently servicing the UE, such as an operator identifier associated with an operator of the network or a PLMN identifier associated with a PLMN. Mobile Location & Provisioning Database 142 may be implemented in a Home Location Register (HLR) or a Visited Location Register (VLR) as known in the art, or a combination of a HLR and a VLR, or a combination of one or more HLRs and/or VLRs.

Communication system 100 further includes at least one user equipment (UE), 102, such as but not limited to a cellular telephone, a radio telephone, a personal digital assistant (PDA) with radio frequency (RF) capabilities, or a wireless modem that provides RF access to digital terminal equipment (DTE) such as a laptop computer, in wireless communication with first network 110 via first RAN 112. UE 102 is capable of receiving and displaying audio, video, and/or data associated with an MBMS service provided by communication system 100, which service provides for a distribution of MBMS data to the UE. MBMS services are described in detail in the 3GPP (Third Generation Partnership Project) standards, and in particular 3GPP TS (Technical Specification) 25.344 v0.5.0, 3GPP TR 23.846 v6.0.0, 3GPP TS 22.146 v6.3.0, 3GPP TS 23.246 v6.1.0, 3GPP TR (Technical Report) 21.905 v5.4.0, and Report R2-030063, which specifications and reports are hereby incorporated by reference herein and copies of which may be obtained from the 3GPP via the Internet or from the 3GPP Organization Partners' Publications Offices at Mobile Competence Centre 650, route des Lucioles, 06921 Sophia-Antipolis Cedex, France.

Each RAN 112, 142 provides communications services to UEs located in a coverage area, such as a cell, serviced by the RAN via a respective air interface 124, 150. Each air interface 124, 150 comprises a downlink and an uplink that each includes multiple communication channels. Each downlink includes a paging channel, at least one downlink control channel, and at least one downlink traffic channel. Each uplink link includes an uplink access channel, at least one uplink control channel, and at least one uplink traffic channel.

Communication system 100 further includes a Multimedia Broadcast/Multicast Service (MBMS) content provider 132, such as an IP multicast server, that is coupled to MBMS server 120 or that may comprise an application running on MBMS server 120. As part of an MBMS service provided by communication system 100 and that may be subscribed to by UE 102, MBMS content provider 132 sources MBMS data, typically in the form of IP data packets, to UE 102 via MBMS server 120.

Figure 2:
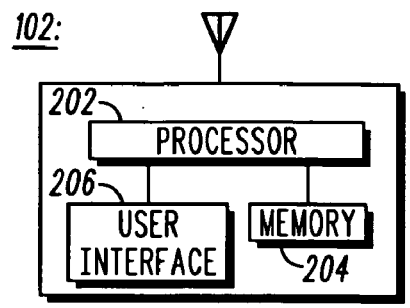
FIG. 2 is a block diagram of a mobile station of FIG. 1 in accordance with an embodiment of the present invention.
Figure 3:
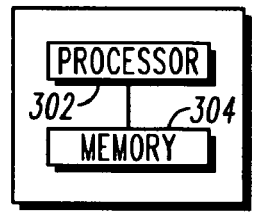
FIG. 3 is a block diagram of a Support Node of FIG. 1 in accordance with an embodiment of the present invention.
Figure 4:
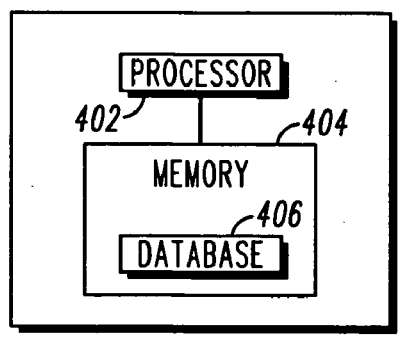
FIG. 4 is a block diagram of a Multimedia Broadcast/Multicast Service (MBMS) Server of FIG. 1 in accordance with an embodiment of the present invention.

Referring now to FIGS. 2-4, each of UE 102, Support Nodes 118 and 148, and MBMS server 120 includes a respective processor 202, 302, and 402 such as one or more microprocessors, microcontrollers, digital signal processors (DSPs), combinations thereof or such other devices known to those having ordinary skill in the art. Each of UE 102, Support Nodes 118 and 148, and MBMS server 120 further includes a respective one or more memory devices 204, 304, and 404 associated with the respective processor, such as random access memory (RAM), dynamic random access memory (DRAM), and/or read only memory (ROM) or equivalents thereof, that maintain data and programs that may be executed by the processor and allow the processor to operate in communication system 100. The one or more memory devices 204 of UE 102 further maintains a mobile identifier (mobile ID) that is uniquely associated with the UE. The one or more memory devices 304, 404 of each of Support Nodes 118 and 148 and MBMS server 120 each further maintains a network service identifier (network service ID) associated with the network in which the Support Node or MBMS server resides and, additionally, the one or more memory devices 304 of each of Support Nodes 118 and 148 maintains a support node identifier (support node ID), such as a routing address of the Support Node, that is uniquely associated with the Support Node.

UE 102 further includes a user interface 206 that is operably coupled to processor 202. User interface 206 includes a display screen 208 and provides a user of the MS with the capability of interacting with the MS, including inputting instructions into the MS. In one embodiment of the present invention, user interface 206 may further include a keypad that includes multiple keys via which a user of the MS may input an instruction to the MS. In another embodiment of the present invention, display screen 208 may comprises a touch screen that is able to determine a position (i.e., an X-coordinate and a Y-coordinate) of a user's touch on the touch screen and convey the position data to processor 202. Based on the position data, processor 202 then translates the user's touch into an instruction. Preferably, the touch screen may display a "keypad" screen that comprises multiple softkeys such softkeys corresponding to keys on a conventional telephone keypad.

Preferably, communication system 100 is a Universal Mobile Telecommunication Service (UMTS) communication system that operates in accordance with the 3GPP (Third Generation Partnership Project) standards, which provide a compatibility standard for UMTS air interfaces and which standards are hereby incorporated herein in their entirety. The standards specify wireless telecommunications system operating protocols, including radio system parameters and call processing procedures. In communication system 100, the communication channels of downlink link 134 or uplink link 135, such as access channels, control channels, paging channels, and traffic channels, each comprises one or more of multiple time slots in a same frequency bandwidth. However, those who are of ordinary skill in the art realize that communication system 100 may operate in accordance with any wireless telecommunication system, such as but not limited to a General Packet Radio Service (GPRS) communication system, a Code Division Multiple Access (CDMA) 2000 communication system, a Time Division Multiple Access (TDMA) communication system, or an Orthogonal Frequency Division Multiple Access (OFDM) communication system.

In order for network 110 to establish a subscription group related to provision of an MBMS service and to notify subscribed UEs of broadcasts/multicasts of associated MBMS data, network 110, and in particular MBMS server 120, generates a Temporary Mobile Group Identity (TMGI) that is assigned to the MBMS service and is distributed to UEs subscribing to the service. The TMGI is uniquely associated with the MBMS service and a home MBMS service network, such as network 110, providing the service. Based on the TMGI, a UE is able to determine whether it is a proper recipient of an MBMS service regardless of whether the UE is being serviced by the UE's home MBMS service network or by a visited MBMS service network.

Figure 5A:
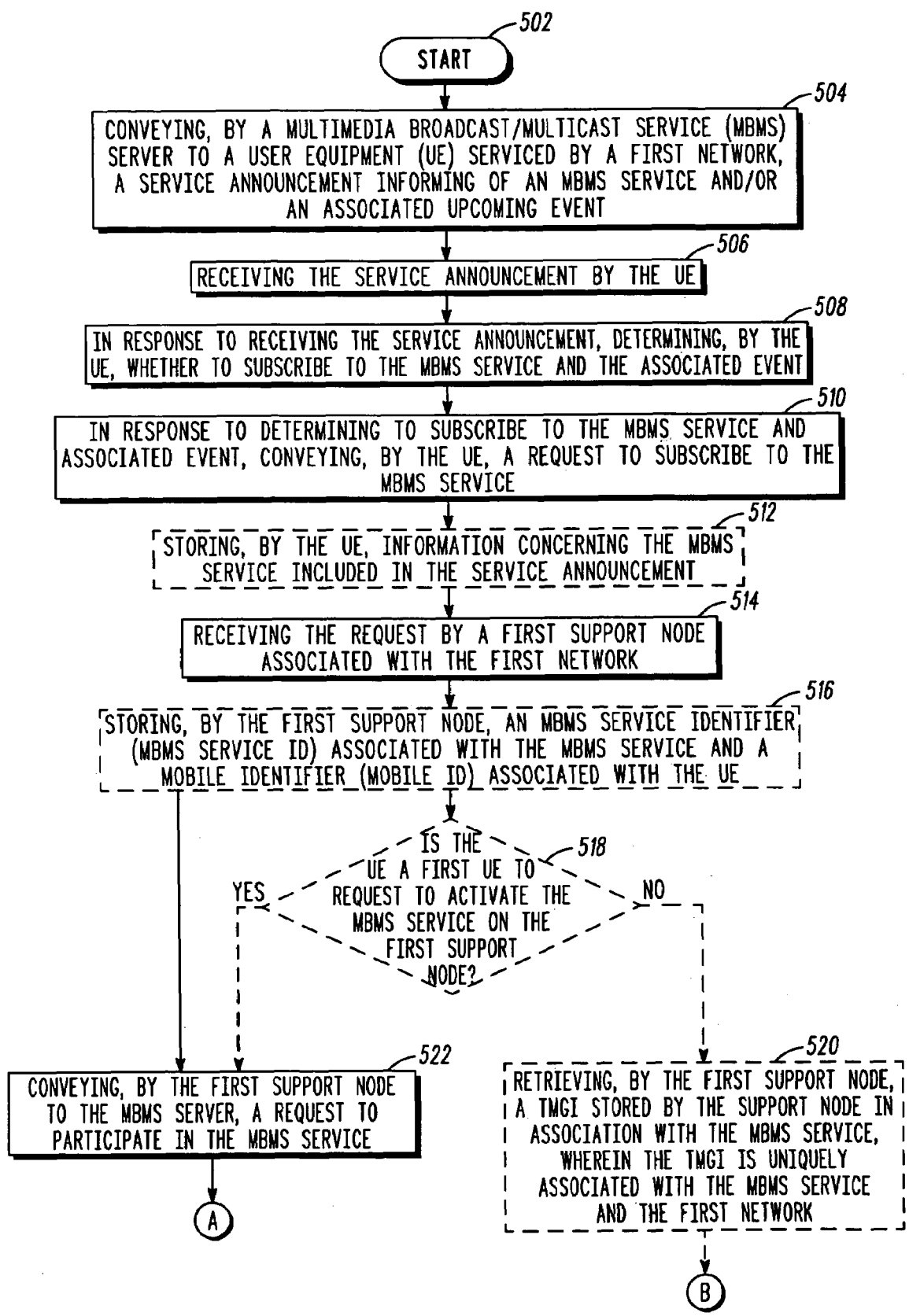
FIG. 5A is a logic flow diagram of a method executed by the communication system of FIG. 1 in providing an MBMS service to a user equipment (UE) in a visited network in accordance with various embodiments of the present invention.
Figure 5B:
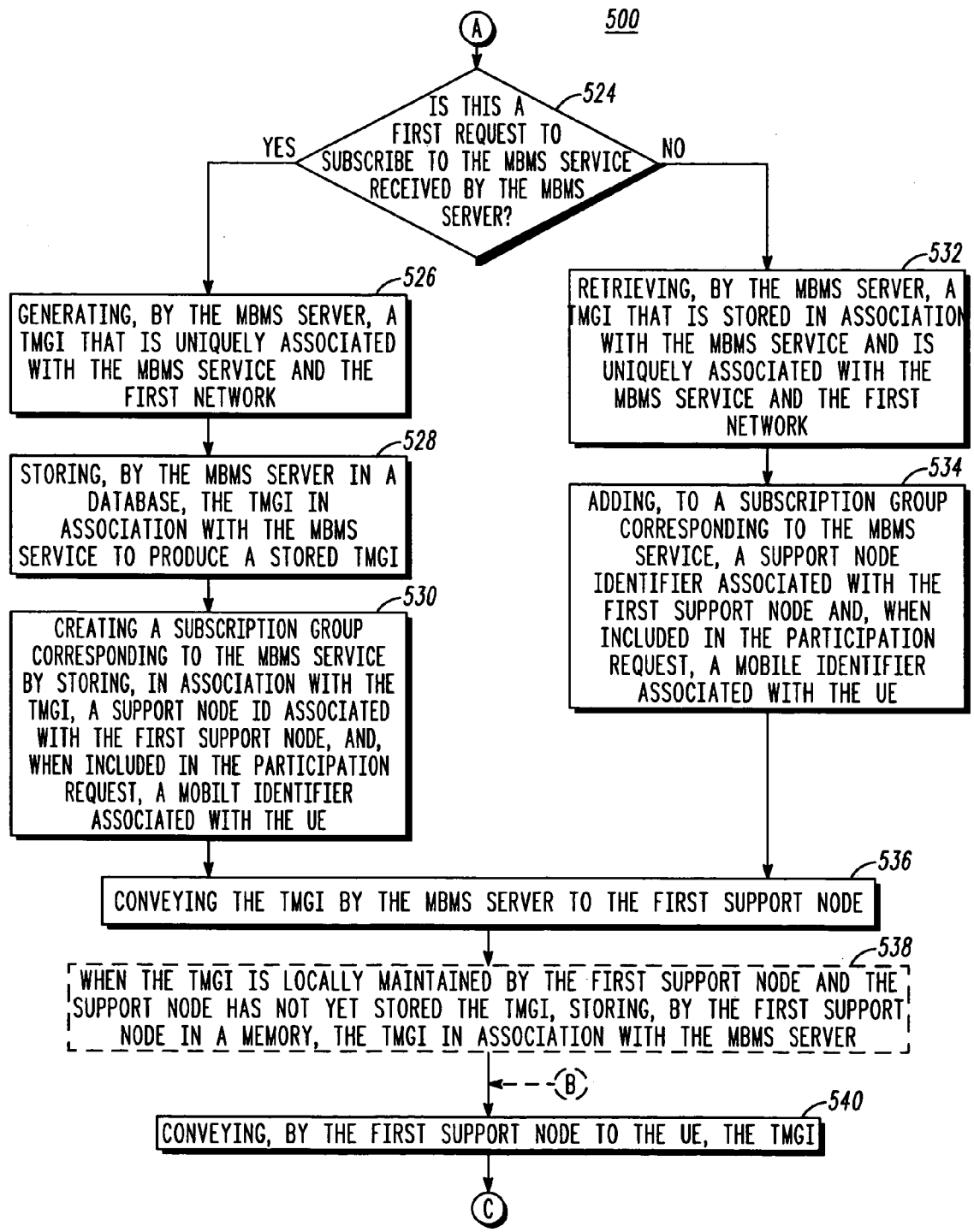
FIG. 5B is a continuation of the logic flow diagram of FIG. 5A depicting a method executed by the communication system of FIG. 1 in providing an MBMS service to a UE in a visited network in accordance with various embodiments of the present invention.
Figure 5C:
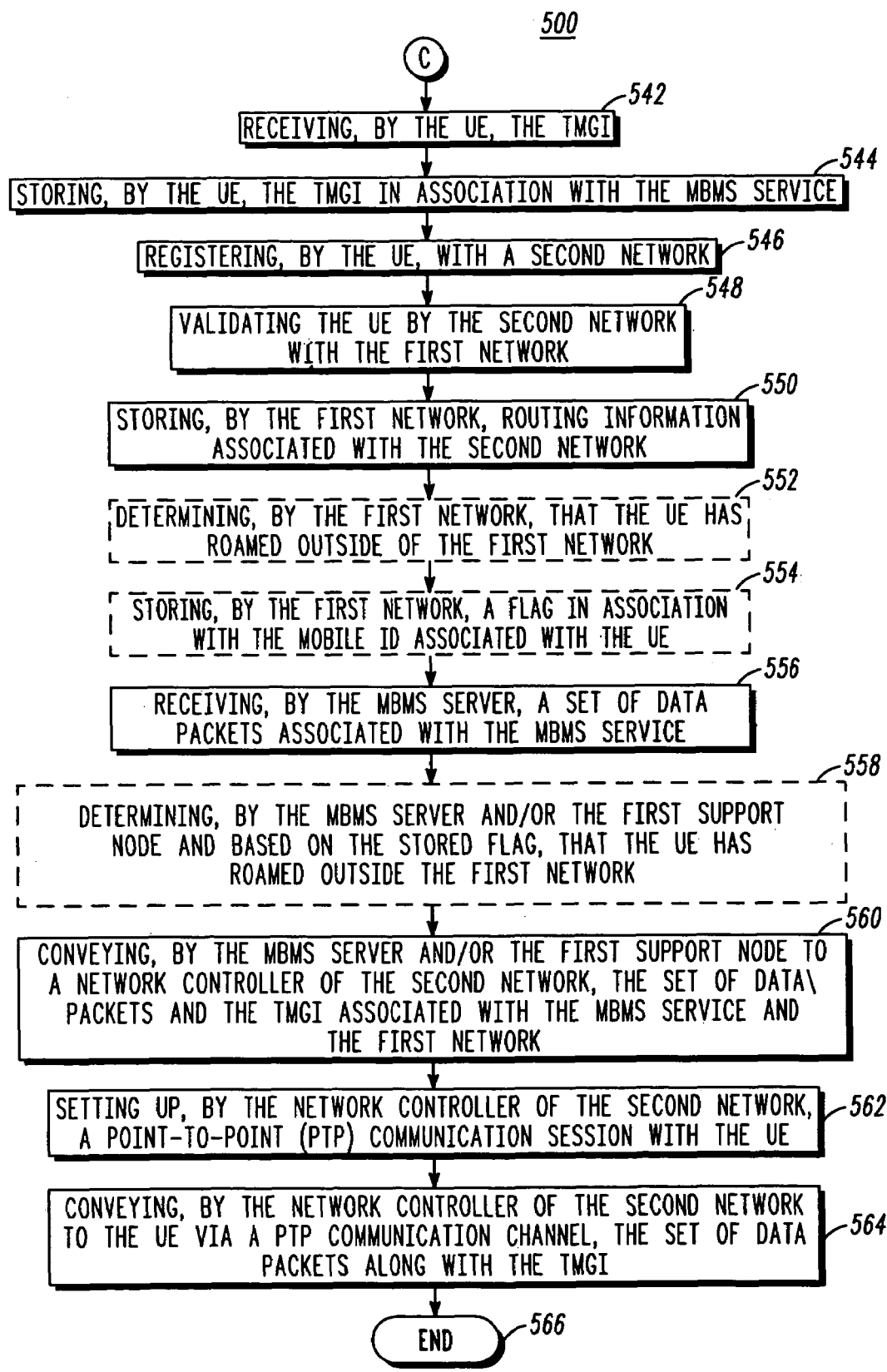
FIG. 5C is a continuation of the logic flow diagrams of FIGS. 5A and 5B depicting a method executed by the communication system of FIG. 1 in providing an MBMS service to a UE in a visited network in accordance with various embodiments of the present invention.

FIGS. 5A, 5B, and 5C depict a logic flow diagram 500 of a method executed by communication system 100 in providing an MBMS service to a UE in a visited MBMS service network in accordance with various embodiments of the present invention. Logic flow diagram 500 begins (502) when a first network, that is network 110, and in particular MBMS server 120, conveys (504) a service announcement concerning an MBMS service, such as a broadcast of a sporting event such as a Super Bowl game or a World Cup soccer game, to UE 102 via Support Node 118 and RAN 112. UE 102 subscribes to communication services provided by an operator of network 110 and resides in a coverage area of network 110, and more particularly transceiver 114 of RAN 112.

The service announcement may be sent in any over-the-air format, such as via a broadcast over a paging channel of air interface 124, via a short message service (SMS), or via a multicast. The service announcement comprises information concerning the event, which information may be used by a user of a UE to determine whether to subscribe to the event. For example, the information may include an MBMS service identifier (MBMS service ID) associated with the MBMS service and may further include, if not provided as at least a part of the MBMS service ID, one or more of a routing address, such as an Internet Protocol (IP) multicast address, associated with an MBMS data source, such as MBMS content provider 132, sourcing the data related to the event, a subject category, such as "sports" and/or more specifically "soccer" when the event is a soccer game, concerning the subject matter of the event, an event title, such "World Cup Game No. 1," and a date and a time of the event.

The MBMS service ID is an identifier that is uniquely associated with the MBMS service. In one embodiment of the present invention, the MBMS service ID may comprise, or be a function of, a routing address, such as an Internet Protocol (IP) multicast address, that identifies the MBMS service. For example, the routing address may be an IP address, for example, 10.10.10.10, associated with an MBMS data source, such as MBMS content provider 132, sourcing the data related to the event or an application on an MBMS server 120 sourcing MBMS data. In another embodiment of the present invention, the MBMS service ID may comprise or be a function of the routing address and may further comprise, or be a function of, an Access Point Name (APN) that is associated with a specific Support Node, such as Support Node 118 or 148, or an MBMS server, such as server 120. For example, the APN may be a Uniform Resource Locator (URL) associated with a service provider, such as the operator of the infrastructure of communication system 100, operating the Support Node or server, for example, "t-mobile.com." In other embodiments of the present invention, the MBMS service ID may be any identifier that distinguishes an MBMS service provided by communication system 100 from all other MBMS services provided by the communication system, thereby allowing the communication system to separately identify each MBMS service.

In response to receiving (506) the service announcement, UE 102 determines (508) whether to subscribe to the MBMS service identified in the service announcement. When UE 102 determines to subscribe to the service, the UE conveys (510) to first network 110 a request to subscribe to the MBMS service. The subscription request includes the MBMS service ID associated with the MBMS service and the mobile ID associated with UE 102. In addition, when the UE 102 determines to subscribe to the MBMS service, the UE may store (512), in the one or more memory devices 204 of the UE, at least a portion of the received information concerning the event, such as the MBMS service ID associated with the MBMS service and/or one or more of a routing address or APN associated with Support Node 118 or MBMS server 120. Network 110, through which UE 102 subscribes to the MBMS service, is herein referred to as the UE's home MBMS service network and the coverage area associated with network 110 is herein referred to as the UE's home MBMS service area. In response to receiving the subscription request, network 110 routes the subscription request to Support Node 118.

In response to receiving (514) the subscription request from UE 102, Support Node 118 may store (516) one or more of the MBMS service ID and the mobile ID included in the subscription request. In addition, in one embodiment of the present invention, when UE 102 is the first UE (518) to activate this specific MBMS service on Support Node 118, in response to receiving the subscription request, Support Node 118 conveys (522) a message to MBMS server 120 requesting to participate in the MBMS service. The participation request includes an identifier associated with the MBMS service, preferably the MBMS service ID and/or the routing address associated with the service, and the support node ID associated with Support Node 118 that identifies the Support Node as the source of the request. The participation request may further include the mobile ID received from UE 102.

In response to receiving the participation request from Support Node 118, when Support Node 118 is (524) the first Support Node to subscribe to the MBMS service at MBMS server 120, MBMS server 120 generates (526) a Temporary Mobile Group Identifier (TMGI) for association with the MBMS service and network 110. MBMS server 120 stores (528) the TMGI in a database 406 included in the one or more memory devices 404 of the MBMS server in association with information relating to the MBMS service, such as the MBMS service ID and/or routing address associated with the MBMS service. MBMS server 120 further creates (530) a subscription group for the MBMS service by storing, in database 406 and in association with the TMGI, the support node ID associated with Support Node 118 and, when included in the participation request, the mobile ID associated with UE 102. When Support Node 118 is not (524) the first Support Node to subscribe to the MBMS service at MBMS server 120, instead of generating a new TMGI, MBMS server 120 retrieves (532) the TMGI already stored in database 406 in association with the MBMS service and adds (534), to the subscription group, the support node ID associated with Support Node 118 and, when included in the participation request, the mobile ID associated with UE 102. MBMS server 120 then conveys (536) the generated or retrieved TMGI to Support Node 118.

In one embodiment of the present invention, Support Node 118 may execute step 522, that is, convey the request to participate in the MBMS service to MBMS server 120, only when UE 102 is the first UE (518) to activate this specific MBMS service on the Support Node. In such an embodiment, when Support Node 118 receives a TMGI from MBMS server 120, the Support Node locally stores (538), in the one or more memory devices 304 of the Support Node, the TMGI in association with the MBMS service, such as in association with the MBMS service ID and/or the routing address associated with the MBMS service. When UE 102 then requests to subscribe to an MBMS service already subscribed to by another UE serviced by Support Node 118 (518), the Support Node may merely retrieve (520) the stored TMGI and convey (540) the retrieved TMGI to the UE without having to again convey a request to MBMS server 120.

In another embodiment of the present invention, Support Node 118 may not locally store a TMGI. In such an embodiment, Support Node 118 may convey a request to participate in the MBMS service to MBMS server 120 each time the Support Node receives a request from a UE, such as UE 102, to activate this specific MBMS service on the Support Node. That is, in such an embodiment of the present invention, Support Node 118 may bypass step 518 and proceed directly from step 514 or step 516 to step 522.

In response to receiving the TMGI from MBMS server 120, or to retrieving a locally stored TMGI from the one or more memory devices 304 of the Support Node, Support Node 118 forwards (540) the received or retrieved TMGI to UE 102 via RAN 112 and air interface 124. Similar to the service announcement, network 110 may convey the TMGI to UE 102 via any cell broadcast format, such as via a paging message over a paging channel, via a short message service (SMS) message, of via a multicast message. In addition, the message conveying the TMGI may further include one or more of the MBMS service ID associated with the MBMS service and the mobile ID associated with the UE subscribing to the event, that is, UE 102, allowing the UE to determine that it is an intended recipient of the TMGI.

When UE 102 receives (542) the TMGI, the UE stores (544) the TMGI in the one or more memory devices 204 of the UE. When, at step 512, the UE stores information associated with the MBMS service, such as an associated MBMS service ID, IP multicast address, or APN, the TMGI may be stored in association with such information. Unless otherwise specified herein, all functions described as being performed herein by UE 102 are performed by processor 202 of the UE, and all functions described as being performed herein by any of Support Nodes 118 and 148 or MBMS server 120 are respectively performed by a processor 302, 402 of the Support Node or server.

The TMGI comprises information associated with the subscription group or MBMS service and further comprises information associated with the network generating the TMGI. In one embodiment of the present invention, the TMGI may be derivative of other information identifying the service, such as the MBMS service ID corresponding to the MBMS service, the routing address associated with MBMS service, or the routing address and the APN associated with MBMS service. In another embodiment of the present invention, the information included in the TMGI may comprise any identifier that uniquely identifies the service, such as an event name such as "World Cup Soccer 2004, Game 1" or an event name, date, and time. In addition, the TMGI includes, or is derivative of, a network service identifier (network service ID) that uniquely identifies the network generating the TMGI relative to other networks providing MBMS services. For example, the network service ID may be an identifier uniquely associated with an operator of network 110, or may be a PLMN identifier associated with network 110 as is known in the art. The TMGI may comprise such information or, when bit space is limited, comprise a shortened version of such information. For example, MBMS server 120 may apply a hashing function to the information in order to determine a shortened version of such information.

When UE 102 leaves its home MBMS service area, that is, the coverage area serviced by network 110, and in particular by MBMS server 120, and moves to a coverage area associated with a second, visited network, such as network 140, the UE registers (546) with the second, visited network 140 in accordance with well-known registration techniques. For example, the registration may be a result of a handoff of UE 102 from first network 110 to second network 140, or the registration may result from UE 102 activating in network 140. As part of the registration of UE 102 with second network 140, Support Node 148 of the second network validates (548) UE 102 by conveying a validation request to network 110, and in particular to Support Node 118 and to Mobile Location & Provisioning Database 118 via the Support Node, requesting provisioning and mobility information associated with the UE and providing information, such a routing information, associated with the second network.

In response to receiving the validation request, Mobile Location & Provisioning Database 122 conveys at least a portion of the provisioning and mobility information stored by the Database in association with UE 102 to Support Node 148. In addition, in response to receiving the validation request, network 110, and in particular Mobile Location & Provisioning Database 122, stores (550), in association with UE 102, the received routing information associated with network 140. For example, Database 122 may receive and store a routing address associated with one or more elements in the communication path between the MBMS server and UE 102, such as one or more elements of visited Support Node 148, visited network controller 146, and visited transceiver 148. In other embodiments of the present invention, Support Node 118 or MBMS server 120, may further store, in association with UE 102 and in the respective one or more memory devices 304 of the Support Node or one or more memory devices 404 and more particularly database 406 of the MBMS server, the routing information associated with network 140.

In another embodiment of the present invention, in response to receiving the validation request from Support Node 148 and in addition to the storage, by Mobile Location & Provisioning Database 122, of information associated with network 140, Support Node 118 may determine (552), based on the validation request, that UE 102 has roamed outside of network 110. For example, a typical validation request may include an IMSI assigned to a UE, such as UE 102, by a network, such as network 140, when the UE registers with the network. The IMSI typically includes a network service ID associated with the network in which the UE is registering. In response to receiving the validation request from network 140, Support Node 118 may evaluate the accompanying IMSI. In evaluating the IMSI, Support Node 118 may compare the network service ID included in the received IMSI to the network service ID associated with network 110 and maintained in the one or more memory devices 304 of the Support Node. When Support Node 118 determines that the network service ID included in the received IMSI is different from the network service ID associated with network 110, then the Support Node may determine that UE 102 has roamed to outside of network 110. In response to determining that UE 102 has roamed to outside of network 110, Support Node 118 may store (554), in the one or more memory devices 304 of the Support Node, a roaming 'flag' in association with UE 102's mobile ID. The roaming flag indicates that UE 102 has roamed outside of the service area of home MBMS service network 110.

In yet another embodiment of the present invention, at step 552, MBMS Server 120, instead of Support Node 118, may determine, based on the validation request, that UE 102 has roamed outside of network 110, again preferably by evaluating the IMSI accompanying the validation request. In response to determining that UE 102 has roamed to outside of network 110, MBMS server 120 may store, at step 554 and in the one or more memory devices 404 and more particularly database 406 of the MBMS server, a roaming 'flag' in association with UE 102's mobile ID.

Upon initiation of the MBMS service, MBMS content provider 132 conveys to MBMS server 120, or to Support Node 118 via MBMS server 120, set of data packets including payload data associated with the MBMS service. In response to receiving (556) the MBMS data, MBMS server 120 or Support Node 118 determines (558) that UE 102 is being serviced by a network other than home MBMS service network 110, that is, by visited network 140. In response to determining that UE 102 is being serviced by a network other than network 110, MBMS server 120 or Support Node 118 conveys (560) the MBMS data and the TMGI associated with the MBMS service and network 110 to a Support Node of second network 140, that is, second Support Node 148, and via the Support Node 148 to a network controller of the second network, that is, second network controller 146.

In one embodiment of the present invention, in response to receiving the set of data packets, Support Node 118, or MBMS server 120 via Support Node 118, may determine that UE 102 is being serviced by a network other than network 110 by querying Mobile Location & Provisioning Database 122 for routing information with respect to UE 102. In response to the query, Mobile Location & Provisioning Database 122 informs MBMS server 120 or Support Node 118, whichever is appropriate, that UE 102 is now serviced by network 140 and provides corresponding routing information. In response to receiving the routing information, MBMS server 120 or Support Node 118 may convey the MBMS data and the TMGI associated with the MBMS service to Support Node 148.

In another embodiment of the present invention, in response to receiving the set of data packets and when MBMS server 120 stores a roaming flag in association with the mobile ID of UE 102, MBMS server 120 may determine, based on the flag, that UE 102 is serviced by another network. In response to determining that UE 102 is serviced by another network 140, MBMS server 120 obtains routing information for UE 102 from Mobile Location & Provisioning Database 122. In yet another embodiment of the present invention, when MBMS server 120 stores routing information with respect to UE 102, then in response to determining that UE 102 has roamed, MBMS server 120 may retrieve the routing information for UE 102 from the one or more memory devices 404 of the MBMS server. By storing the routing information in the one or more memory devices 404 of the MBMS server, the MBMS server need not reference the Mobile Location & Provisioning Database 122 in order to route the MBMS data to roaming UE 102. Based on the routing information, MBMS server 120 conveys the received MBMS data and the TMGI associated with the MBMS service to network 140, and in particular to Support Node 148.

In still another embodiment of the present invention, in response to receiving the set of data packets and when Support Node 118 stores a roaming flag in association with the mobile ID of UE 102, MBMS server 120 routes to Support Node 118 the received MBMS data and the TMGI associated with the MBMS service. In response to receiving the data and TMGI, Support Node 118 determines, based on the flag, that UE 102 is serviced by another network. In response to determining that UE 102 is serviced by another network 140, Support Node 118 obtains routing information for UE 102 from Mobile Location & Provisioning Database 122. In yet another embodiment of the present invention, when Support Node 118 stores routing information with respect to UE 102, then in response to determining that UE 102 has roamed, the Support Node may then retrieve the routing information for UE 102 from the one or more memory devices 304 of the Support Node. Similar to MBMS server 120, by storing the routing information in the one or more memory devices 304 of Support Node 118, the Support Node need not reference the Mobile Location & Provisioning Database 122 in order to route the MBMS data to roaming UE 102. Based on the routing information, Support Node 118 conveys the received MBMS data and the TMGI associated with the MBMS service to network 140, and in particular to Support Node 148, and Support Node 148 routes the MBMS data and the TMGI to network controller 146.

In response to receiving the data packets and TMGI, network controller 146 of network 140 sets up (562) a PTP communication session with UE 102 in accordance with well-known MBMS service techniques. That is, in response to receiving the data packets and TMGI, network controller 146 broadcasts an MBMS notification via transceiver 144 and a downlink control channel of air interface 150. The notification includes the TMGI assigned to the subscription group and associated with the MBMS service and home MBMS service network 110 and may further include the MBMS service ID associated with the MBMS service.

When UE 102 receives the notification, the UE determines that it is an intended recipient of the notification by comparing the TMGI included in the notification to the TMGI stored in the one or more memory devices 204 of the UE. Since the TMGI is unique to the UE's home MBMS service network 110, UE 102 is able to distinguish the TMGI from TMGIs that may be generated and utilized by visited network 140. In addition, since the TMGI is unique to network 110, UEs serviced by, and that have subscribed to, an MBMS service provided by visited network 140, that is, UE's whose home MBMS service network is network 140, will not respond to this notification.

In response to determining that it is an intended recipient of the notification, UE 102 informs a user of the UE that the MBMS service is about to start, preferably by providing a text or audio message via user interface 206 of the UE. In response to receiving the message, the user of UE 102 may determine whether to join the service. When the user determines to not join the service, the user need not reply to the message. When the user determines to join the service, the user inputs his or her desired to join the service, for example, by selecting indicated text, a softkey, or a key, displayed in user interface 206 of the UE.

In response to receiving the user's desire to join the service, UE 102 conveys a connection request, typically a Radio Resource Control (RRC) connection establishment request, to network controller 146 via an access channel in air interface 150 and transceiver 144. Upon receiving the connection request from UE 102, network controller 146 establishes a PTP communication channel with UE 102 at transceiver 144. Upon establishing the PTP communication channel, network controller 146 conveys (564) the MBMS data to UE 102 via the established channel. Logic flow 500 then ends (566).

By using a TMGI that is unique to UE 102's home MBMS service network 110, the UEs subscribed to an MBMS service at network 140 ignore the notification conveyed to UE 102 by network 140. By ignoring the notification, such UEs avoid consuming processing power that would otherwise be consumed in determining whether they have subscribed to, and wish to receive, the MBMS service, thereby preserving a battery life of such UEs. With the ever increasing number of applications being executed by UEs, preserving battery life is a constant and important issue for cellular system operators. As a result, communication system 100 provides an MBMS service to a roaming UE 102 in a manner that has minimal impact on other UEs in the network to which UE 102 has roamed. The provision of the MBMS service via the roamed to network, that is, network 140, is transparent to the roaming UE, thereby enhancing the experience of the user of the roaming UE.

Furthermore, by allowing for the Support Node or the MBMS server of UE 102's home MBMS service network 110, that is, Support Node 118 or MBMS server 120, to determine whether the UE has roamed, the process is simplified with respect to determining when the Support Node or MBMS server may obtain routing information from Mobile Location & Provisioning Database 122. That is, when Support Node 118 or MBMS server 120 determine that UE has roamed to another network, the Support Node or MBMS server flag the UE. When MBMS data is received for an MBMS service subscribed to by the UE and no flag is stored in association with the UE, MBMS server 120 may forward the data to participating Support Node 118 and the Support Node may then forward the data to serving network controller 116 without referencing Mobile Location & Provisioning Database 122. When MBMS data is received for an MBMS service subscribed to by the UE and a flag is stored in association with the UE, MBMS server 120 or Support Node 118 may then reference Mobile Location & Provisioning Database 122 to determine how to route the data to the UE. In yet other embodiments of the present invention, when MBMS server 120 or Support Node 118 determine, based on the flag, that UE 102 has roamed, then in response to the determination, the MBMS server or the Support Node may retrieve routing information for UE 102 from their respective memory devices 304 and 404. In this manner MBMS server 102 and Support Node 118 may be able to route MBMS data to UE 102 without referencing Mobile Location & Provisioning Database 122 even when the UE is roaming.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for providing a Multimedia Broadcast/Multicast Service (MBMS) to a roaming user equipment (UE) comprising:
   receiving a request from the UE to subscribe to an MBMS service;
   in response to receiving the request, conveying to the UE a Temporary Mobile Group Identity (TMGI) associated with the MBMS service and with a first network associated with the MBMS server;
   receiving information associated with a registration of the UE with a second network, wherein each TMGI allocated by the second network is different from the TMGI associated with the MBMS service and the first network;

receiving, by the MBMS server, MBMS data associated with the MBMS service; and conveying the MBMS data and the TMGI associated with the first network to the UE via the second network.

2. The method of claim 1, wherein receiving a request to subscribe to a Multimedia Broadcast/Multicast Service (MBMS) comprises:

receiving, by a Support Node from the user equipment (UE), a request to subscribe to an MBMS service;

in response to receiving the request to subscribe to the MBMS service, conveying, by the Support Node to an MBMS server, a request to participate in the MBMS service; and receiving, by the MBMS server, the request to participate in the MBMS service.

3. The method of claim 2, further comprising creating a subscription group comprising the Temporary Mobile Group Identity and a support node identifier associated with the Support Node.

4. The method of claim 2, further comprising adding a support node identifier associated with the Support Node to subscription group comprising the Temporary Mobile Group Identity.

5. The method of claim 2, wherein conveying comprises:

in response to receiving the request to participate in the Multimedia Broadcast/Multicast Service (MBMS), generating, by the MBMS server, a Temporary Mobile Group Identity (TMGI) associated with the MBMS service and the first network; and conveying the TMGI to the user equipment.

6. The method of claim 2, wherein conveying comprises:

in response to receiving the request to participate in the Multimedia Broadcast/Multicast Service (MBMS) service, retrieving, by the MBMS server, a stored Temporary Mobile Group Identity (TMGI) associated with the MBMS service and the first network; and conveying the TMGI to the user equipment.

7. The method of claim 1, further comprising:

in response to receiving the registration of the user equipment (UE) via the second network, storing a flag in association with the UE; and in response to receiving the Multimedia Broadcast/Multicast Service (MBMS) data, determining that the UE has roamed outside of the first network based on the flag.

8. The method of claim 1, wherein conveying comprises:

storing information concerning the second network; and conveying the Multimedia Broadcast/Multicast Service (MBMS) data and the Temporary Mobile Group Identity to the UE via the second network based on the stored information.

9. The method of claim 1, further comprising:

conveying the Temporary Mobile Group Identity to the user equipment (UE); and storing, by the UE, the TMGI.

10. The method of claim 1, wherein the step of conveying comprises:

setting up a Point-to-Point (PTP) communication channel between a transceiver of the second network and the user equipment (UE) without first counting a number of user equipment serviced by the transceiver; and conveying the MBMS data and the TMGI to the UE via the PTP communication channel.

11. The method of claim 1, wherein conveying a Temporary Mobile Group Identity (TMGI) comprises:

in response to receiving the request to participate in the Multimedia Broadcast/Multicast Service (MBMS) service, retrieving a stored Temporary Mobile Group Identity (TMGI) associated with the MBMS service and the first network; and conveying the TMGI to the user equipment.

12. A Multimedia Broadcast/Multicast Service (MBMS) server that receives a request associated with a user equipment (UE) to participate in an MBMS service, in response to receiving the request, conveys a Temporary Mobile Group Identity (TMGI) associated with the MBMS service and a first network in which the MBMS server resides, receives MBMS data associated with the MBMS service, and conveys the MBMS data and the TMGI to the UE via a second network, wherein each TMGI allocated by the second network is different from the TMGI associated with the MBMS service and the first network.

13. The Multimedia Broadcast/Multicast Service server of claim 12, wherein receiving a request to participate in a Multimedia Broadcast/Multicast Service (MBMS) comprises receiving, from a Support Node, a request to participate in the MBMS service and wherein the request to participate is associated with a request to subscribe to the MBMS service received by the Support Node from the UE.

14. The Multimedia Broadcast/Multicast Service server of claim 13, further comprising creating a subscription group comprising the Temporary Mobile Group Identity and a support node identifier associated with the Support Node.

15. The Multimedia Broadcast/Multicast Service server of claim 13, further comprising adding a support node identifier associated with the Support Node to subscription group comprising the Temporary Mobile Group Identity.

16. The Multimedia Broadcast/Multicast Service (MBMS) server of claim 13, wherein conveying a Temporary Mobile Group Identity (TMGI) comprises, in response to receiving the request to participate in the MBMS service, generating a TMGI associated with the MBMS service and the first network and conveying the TMGI.

17. The Multimedia Broadcast/Multicast Service (MBMS) server of claim 13, wherein conveying a Temporary Mobile Group Identity (TMGI) comprises, in response to receiving the request to participate in the MBMS service, retrieving a stored Temporary Mobile Group Identity (TMGI) associated with the MBMS service and the first network and conveying the TMGI.

18. The Multimedia Broadcast/Multicast Service (MBMS) server of claim 12, wherein the server further determines that the user equipment (UE) is serviced by the second network, stores a flag in association with the UE in response to determining that the UE is serviced by the second network, and, based on the stored flag, conveys the MBMS data and the Temporary Mobile Group Identity to the UE via the second network.

* * * * *